United States Patent [19]

Shamoto

[11] Patent Number: 5,151,641
[45] Date of Patent: Sep. 29, 1992

[54] ELECTRIC AUTOMOBILE DRIVING APPARATUS

[75] Inventor: Sumikazu Shamoto, Suntou, Japan

[73] Assignee: Toyota Jidosha Kabushiki Kaisha, Aichi, Japan

[21] Appl. No.: 563,209

[22] Filed: Aug. 6, 1990

[30] Foreign Application Priority Data

Aug. 21, 1989 [JP] Japan .................... 1-215706

[51] Int. Cl.$^5$ ............................. H02P 3/18
[52] U.S. Cl. .................... 318/762; 320/14; 307/46
[58] Field of Search ......... 320/14, 15, 19, 21; 318/757–762; 307/46, 48, 66

[56] References Cited

U.S. PATENT DOCUMENTS

| 3,321,688 | 5/1967 | von Delden . |
| 3,611,091 | 10/1971 | Genovese ........................ 320/19 |
| 4,055,789 | 10/1977 | Lasater ........................ 320/14 |
| 4,237,410 | 12/1980 | Erickson et al. ............... 320/14 |
| 4,500,824 | 11/1985 | Miller ........................ 318/701 |
| 4,787,021 | 11/1988 | Hokari ........................ 318/803 |
| 4,985,819 | 1/1991 | Mori et al. ................... 320/14 |

FOREIGN PATENT DOCUMENTS

| 1141763 | 1/1969 | United Kingdom . |
| 1434692 | 5/1976 | United Kingdom . |
| 1469601 | 4/1977 | United Kingdom . |
| 1604066 | 12/1981 | United Kingdom . |

Primary Examiner—Jr. Smith
Attorney, Agent, or Firm—Oliff & Berridge

[57] ABSTRACT

An electric automobile driving apparatus installed in an electric automobile for driving the same. The driving force of the electric automobile is generated by a main battery as the rotating force of a motor. The motor is an AC motor and driven by an AC current output from the main battery and converted into a DC voltage by an inverter. Electric appliances installed in the automobile are driven by a DC voltage having a different value which is output from an auxiliary battery. The auxiliary battery is charged with the DC voltage obtained by rectifying the output from a secondary coil which is disposed in close proximity to a primary coil of the motor.

20 Claims, 10 Drawing Sheets

ELECTRIC AUTOMOBILE DRIVING APPARATUS

BACKGROUND OF THE INVENTION

1. Field of the Invention

The present invention relates to an electric automobile driving apparatus for driving the motor by converting the DC voltage supplied to the main battery into an alternating current and, more particularly, to an electric automobile driving apparatus provided with an auxiliary battery for supplying a DC voltage to the electric appliances installed in the automobile.

2. Description of the Related Art

Figure 8:
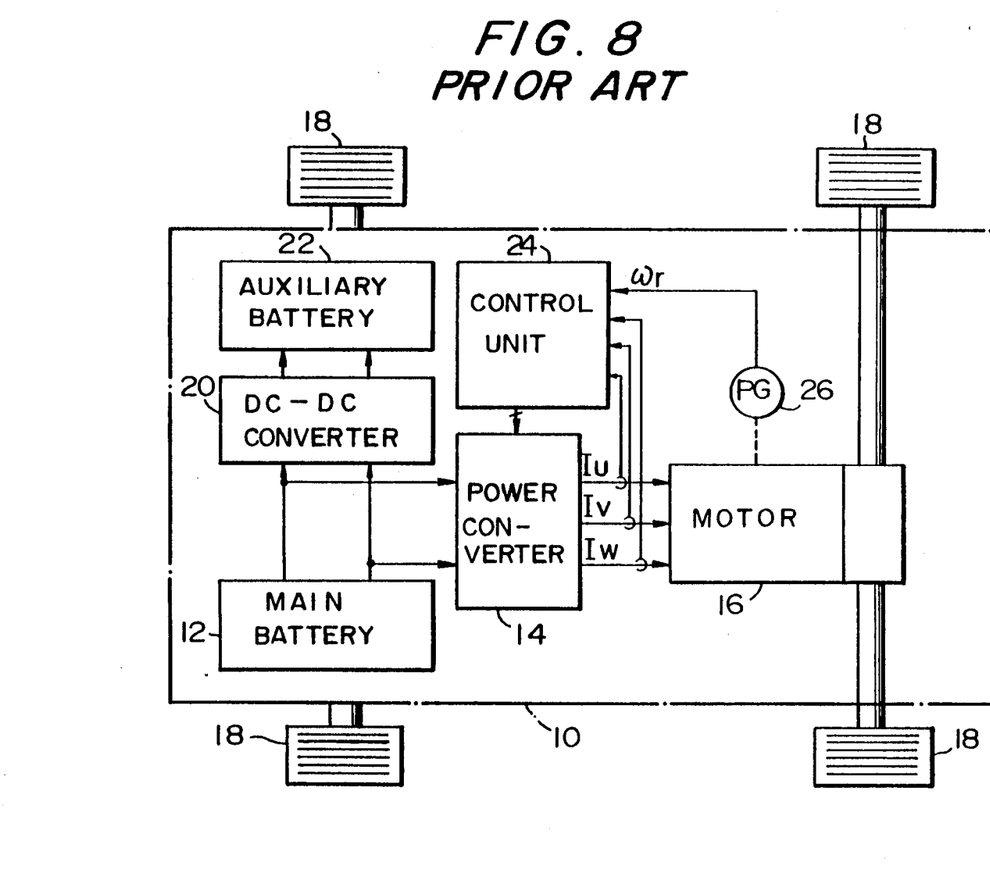
FIG. 8 shows a first example of the structure of a conventional electric automobile driving apparatus.

FIG. 8 shows an example of a conventional electric automobile driving apparatus.

In FIG. 8, an electric automobile driving apparatus installed in an electric automobile 10 includes a main battery 12 for outputting a DC voltage, a power converter 14 for converting the DC voltage output from the main battery 12 into alternating currents of three phases $I_U$, $I_V$, $I_W$, and a motor 16 which is driven by the alternating currents $I_U$, $I_V$, $I_W$.

The DC voltage output from the battery 12 is converted into the alternating currents $I_U$, $I_V$, $I_W$ by the power converter 14 which is constituted by, for example, an inverter.

The alternating currents $I_U$, $I_V$, $I_W$ are supplied to the primary coil of the motor 16. In the motor 16, the alternating currents $I_U$, $I_V$, $I_W$ are converted into an alternating field, thereby producing a rotational driving force. The rotational driving force is supplied to for example, a rear wheel 18 through an axle. In this way, the electric automobile 10 is driven.

To the main battery 12, a DC-DC converter 20 is connected which converts the DC voltage output from the main battery 12 into a DC voltage having a different value.

An auxiliary battery 22 for supplying a DC voltage to the electric appliances installed in the automobile is connected to the DC-DC converter 20.

The DC voltage output from the main battery 12 is converted into a DC voltage having a different value (e.g., 12 V) by the DC-DC converter 20, and the auxiliary battery 22 is charged with the converted DC voltage. The auxiliary battery 22 is a battery for driving the electric appliances installed in the automobile such as a lamp and a wiper. It is generally necessary that these electric appliances installed in the automobile are driven by a voltage having a different value from the DC voltage output from the main battery 12 so as to drive the motor 16. Therefore, the auxiliary battery 22 is charged with a DC voltage having a different value from that output from the main battery 12, and outputs a voltage to the electric appliances installed in the automobile, if necessary.

The conventional electric automobile driving apparatus is provided with a control unit 24 for controlling the power converter 14. A pulse generator 26 for detecting the number of revolutions $\omega_r$ of the motor 16 is connected to the control unit 24 and the information on the alternating currents $I_U$, $I_V$, $I_W$ is input from the pulse generator 26 to the control unit 24.

Figure 9:
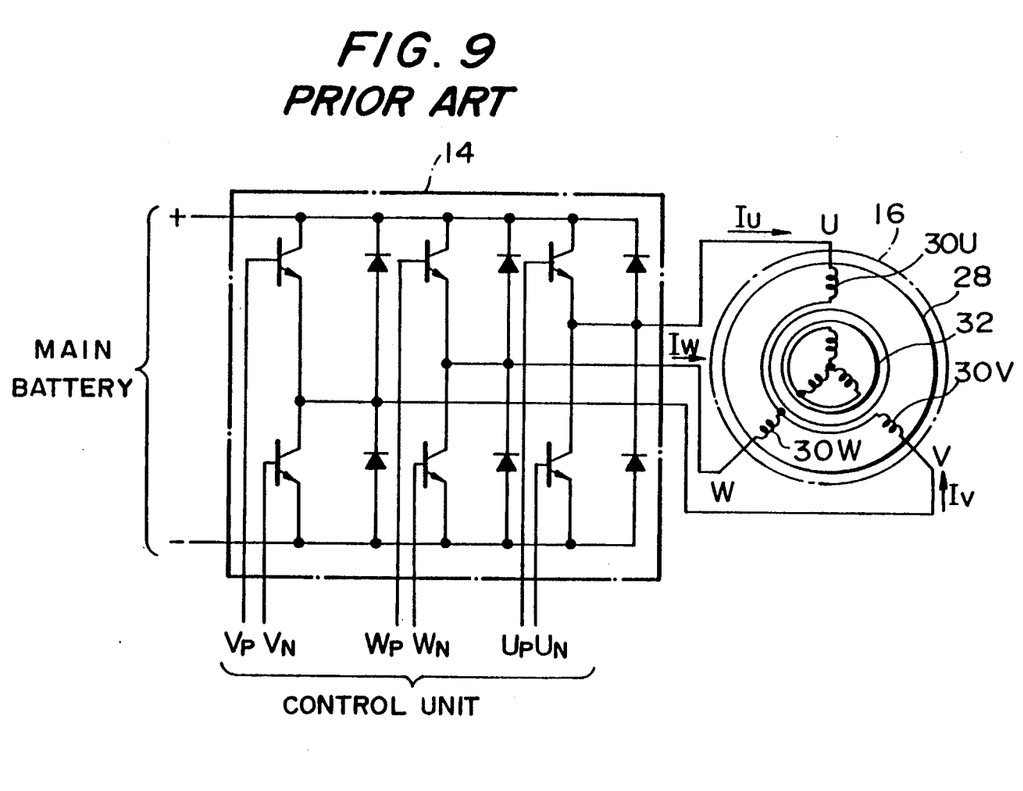
FIG. 9 is a circuit diagram of the power converter in the conventional apparatus shown in FIG. 8.

FIG. 9 shows the structure of the power converter 14 which is controlled by the control unit 24.

In FIG. 9, the power converter 14 is provided with two transistors connected in series to each other and two diodes connected in series to each other in correspondence to each of the phases U, V and W of the motor 16. Both ends of these two transistors connected in series to each other and two diodes connected in series to each other are connected to the main battery 12, and the connecting points of the direct connection thereof are connected to the corresponding phases of the motor 16.

In the motor 16, the output end of the power converter 14 is connected to one end of a primary coil 30 disposed on a stator 28. In FIG. 9, the primary coils 30U, 30V and 30W of the respective phases are connected to each other in a Y-connection.

The power converter 14 shown in FIG. 9 is controlled by a control signal supplied from the control unit 24.

For example, a control signal $U_P$ output from the control unit 24 is supplied to the base of the transistor which is connected to the positive side of the main battery 12 in correspondence with the U-phase of the motor 16 and, similarly, a control signal $U_N$ output from the control unit 24 is supplied to the base of the transistor which is connected to the negative side of the main battery 12 in correspondence with the U-phase of the motor 16.

The ON/OFF of the transistors are controlled by these control signals $U_P$ and $U_N$. Similarly, the ON/OFF of the transistors corresponding to the V-phase are controlled by control signals $V_P$ and $V_N$ and the ON/OFF of the transistors corresponding to the W-phase are controlled by control signals $W_P$ and $W_N$. If such ON/OFF control is carried out such that the DC currents $I_U$, $I_V$, $I_W$ supplied to the respective U-, V- and W-phases alternate, an alternating field is produced within the motor 16 and a rotor 32 is rotated by the alternating field.

Figure 10:
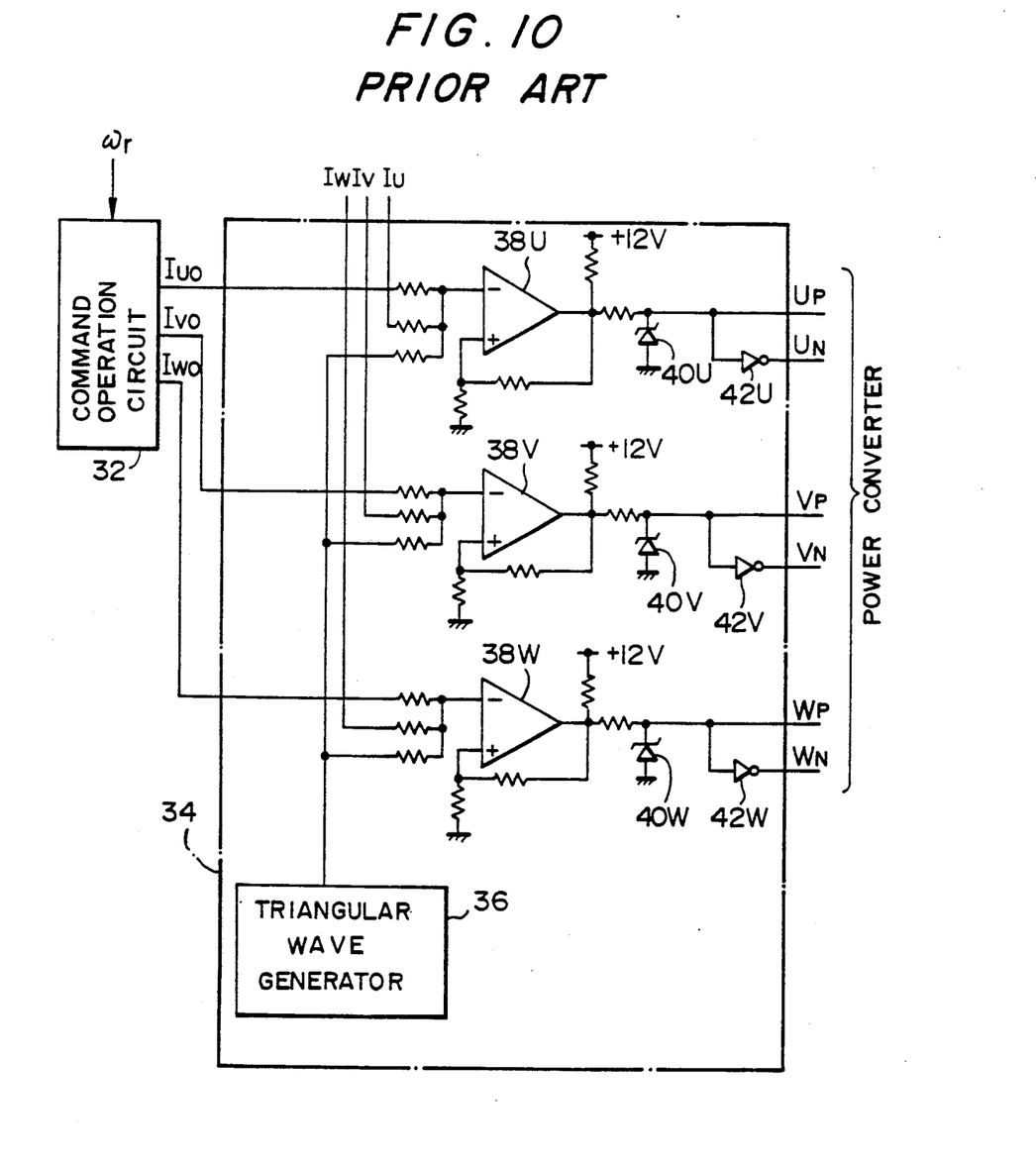
FIG. 10 is a circuit diagram of the control unit in the conventional apparatus shown in FIG. 8.

FIG. 10 shows the structure of the control unit 24 for controlling the current of the power converter 14.

In FIG. 10, the control unit 24 is composed of a command operation circuit 32 for calculating the desired values $I_{UO}$, $I_{VO}$ and $I_{WO}$ of the alternating currents $I_U$, $I_V$ and $I_W$ on the basis of the number of revolutions $\omega_r$ of the motor 16 and a control signal generator 34 for outputting the control signals $U_P$, $U_N$, $V_P$, $V_N$, $W_P$ and $W_N$ on the basis of the desired values $I_{UO}$, $I_{VO}$ and $I_{WO}$. The control signal generator 34 is composed of a triangular wave generator 36 for generating a triangular wave having a predetermined frequency, an operational amplifier 38 for outputting a PWM pulse signal, a constant-voltage diode 40 connected to the output end of the operational amplifier 38, and an NOT 42 for inverting the pulse signal supplied through the constant-voltage diode 40.

When the number of revolutions $\omega_r$ of the motor 16 is detected by the pulse generator 26, the desired values $I_{UO}$, $I_{VO}$ and $I_{WO}$ are calculated and determined by the command operation circuit desired values $I_{UO}$, $I_{VO}$ and $I_{WO}$ are input to the operational amplifiers 38U, 38V and 38W, respectively.

To the operational amplifiers 38U, 38V and 38W are input the signals representing the actual alternating currents $I_U$, $I_V$ and $I_W$, respectively, and further the triangular wave output from the triangle wave generator 36. The operational amplifiers 38U, 38V and 38W output pulse voltages subjected to PWM in correspondence with the difference between the desired values and the actual alternating currents as the control signals $U_P$, $V_P$ and $W_P$, respectively. These control signals $U_P$, $V_P$ and $W_P$ are inverted by the NOT's 42U, 42V and 42W, respectively, and output as the control signals $U_N$, $V_N$ and $W_N$, respectively.

Figure 11:
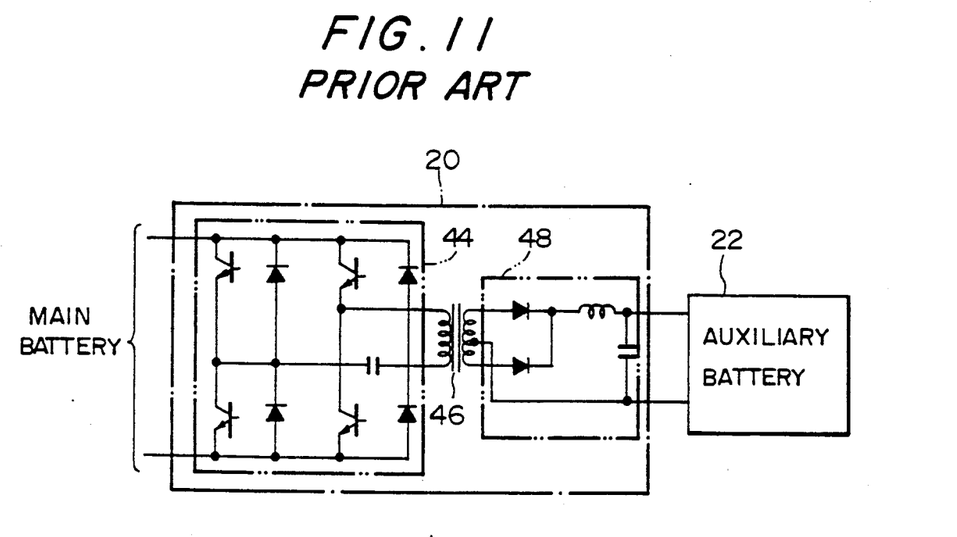
FIG. 11 is a circuit diagram of the DC-DC convertor in the conventional apparatus shown in FIG. 8.

FIG. 11 shows the structure of the DC-DC converter 20.

In FIG. 11, the DC-DC converter is composed of a DC/AC converter 44 for converting the DC voltage supplied from the main battery 12 into an AC voltage, a transformer 46 for transforming the AC voltage output from the DC/AC converter 44, and a rectifier 48 for rectifying the output of the transformer 46.

The rectifier 48 is connected to the auxiliary battery 22. The DC voltage output from the main battery 12 is converted into an AC voltage by the DC/AC converter 44, and transformed by the transformer 46. The AC voltage output from the transformer 46 is rectified by the control unit 48 but the DC voltage obtained as a result of the rectification has a different value from that of the DC voltage output from the main battery 12. For example, if the DC voltage output from the main battery is 100 V, the DC voltage supplied to the auxiliary battery 22 is set at 12 V. The auxiliary battery 22 is charged with the DC voltage output from the rectifier 48 and outputs the rectified DC voltage to electric appliances installed in the automobile.

Figure 12:
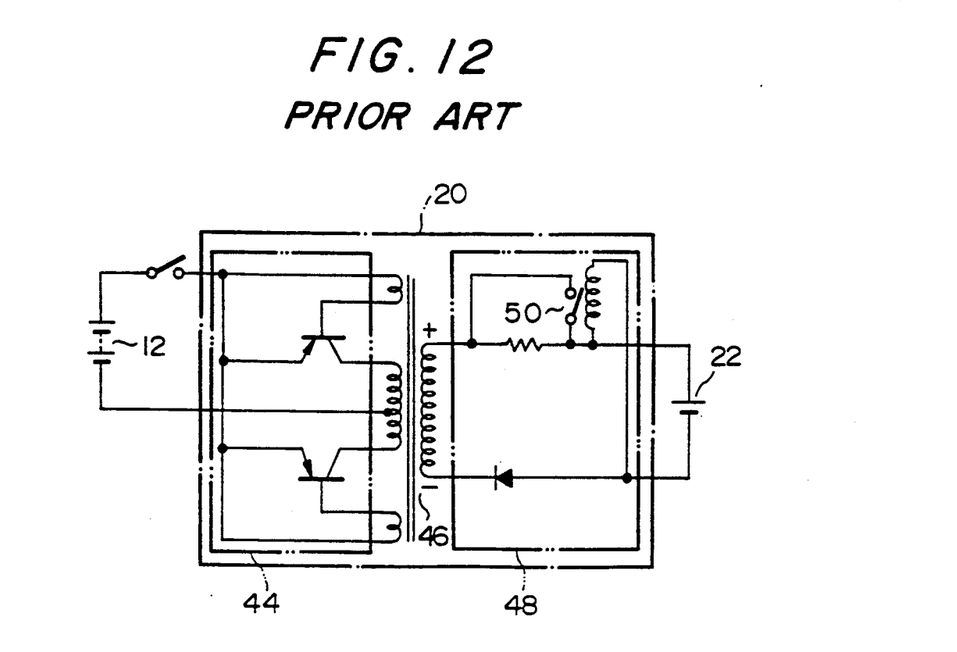
FIG. 12 is a circuit diagram of a second example of the structure of a conventional electric automobile driving apparatus.

FIG. 12 shows another example of the structure of a conventional electric automobile driving apparatus.

This example is the same as that disclosed in, for example, Japanese Utility Model Laid-Open No. 111827 (1973). In FIG. 12, the DC-DC converter 20 is only shown.

The rectifier 48 in this example includes a relay 50 which is turned on/off by the output voltage of the transformer 46.

In the first and second examples of the conventional electric automobile driving apparatus, the DC voltage output from the main battery 12 is converted into the alternating currents $I_U$, $I_V$ and $I_W$, and the motor 16 is driven by the alternating currents $I_U$, $I_V$ and $I_W$.

The DC voltage output from the main battery 12 is converted into a DC voltage having a different value by the DC-DC converter 20, and the auxiliary battery 22 is charged with the converted voltage.

In this way, the electric automobile 10 is driven and the electric appliances installed in the electric automobile 10 are operated by the DC voltage supplied from the auxiliary battery 22.

The conventional electric automobile driving apparatus having the above-described structure, however, has some problems in design, cost, reliability, etc. because the DC-DC converter for charging the auxiliary battery is necessary, thereby making the structure complicated. In addition, the DC-DC converter includes a transformer which generally has a large weight, thereby suffering from the problem of the large weight of an electric automobile.

SUMMARY OF THE INVENTION

Accordingly, it is an object of the present invention to eliminate the above-described problems in the related art and to provide an electric automobile driving apparatus which is reduced in weight and cost by dispensing with the DC-DC converter.

To achieve this aim, an electric automobile driving apparatus according to the present invention comprises: a main battery, an inverter, a motor, a control unit, an auxiliary battery and a rectifier, the motor being provided with primary and secondary coils.

The components of the electric automobile driving apparatus according to the present invention will now be explained.

The main battery outputs a DC voltage having a predetermined value and supplies the DC voltage to the inverter, as in a conventional electric automobile driving apparatus.

The inverter receives the DC voltage from the main battery and converts the DC voltage into the same number of alternating currents as a predetermined number of phases.

The alternating currents output from the inverter are supplied to the primary coils of the motor. The motor is provided with the same number of primary coils as the predetermined number of phases. These primary coils, which have received the alternating currents, produce a magnetic field which rotates the motor.

In order to rotate the motor, the magnetic field produced on the primary coils must be an alternating field. Therefore, the control unit alternates the alternating currents supplied from the inverter to the primary coils.

The above-described structure and operation thereof are the same as those conventionally used for driving an electric automobile.

The characteristic feature of the present invention lies in that the secondary coils are provided in close proximity to the primary coils of the motor, in that the rectifier for rectifying the secondary alternating voltage induced in the secondary coils is provided, and in that the auxiliary battery is charged with the voltage (charging voltage) output from the rectifier.

The secondary coils together with the primary coils constitute a transformer. In other words, in the second coils disposed in close proximity to the primary coils, a secondary voltage having a predetermined value is induced by the magnetic field produced from the alternating currents supplied from the inverter to the primary coils.

Although the number of primary coils provided in the motor corresponds to the number of phases, it is not always necessary that the secondary coils are provided in correspondence with all the primary coils. If a secondary coil is provided in close proximity to at least one of the primary coils, a transformer is sufficiently constituted.

The primary voltage induced in the secondary coils is supplied to the rectifier so as to charge the auxiliary battery.

The auxiliary battery is a battery for supplying a driving voltage to the electric appliances installed in the automobile. The DC voltage for driving an electric automobile (i.e., the output voltage of the main battery) and the DC voltage for driving the electric appliances installed in the automobile (which is called electric auxiliary appliances of an electric automobile) such as a lamp (the DC voltage is called an auxiliary voltage) generally have different values.

In the present invention, the auxiliary battery is charged with the charging voltage output from the rectifier.

Therefore, according to the present invention, a device such as a DC-DC converter which is conventionally used for charging the auxiliary battery is dispensed with. Since the DC-DC converter which is provided with a transformer generally composed of a heavy material is dispensed with in the present invention, it is possible to reduce the weight of the electric automobile driving apparatus as a whole.

The DC-DC converter is replaced with the primary coils and the rectifier in the present invention, which means that a comparatively expensive device is replaced with a cheap device. It is therefore also possible to achieve the reduction in cost of the electric automobile driving apparatus.

The electric automobile driving apparatus according to the present invention may also include a motor driving control means and a motor stopping control means in the control unit.

In this structure, the motor driving control means has a function of the control unit in the above-described structure.

The motor driving control means alternates the alternating currents output from the inverter when the rotation of the motor is required, whereby the motor is rotated.

The motor stopping control means stops the alternation of the alternating currents which are output from the inverter under a predetermined condition. As described above, the alternation of the alternating currents causes the motor to rotate. Therefore, "stopping" means the operation which does not rotate the motor while the alternating current is supplied to the motor.

The condition under which the motor stopping control means stops the alternation (the above-described "predetermined condition") is that at least the suspension of the motor and the charging of the auxiliary battery are required. When this condition is satisfied and the motor stopping control means operates so as to stop the alternation of the alternating current, the motor is maintained in a stopped state and a secondary voltage is induced in the secondary coils.

In this structure, even if the voltage of the auxiliary battery is dropped during the suspension of the motor, it is possible to charge the auxiliary battery by the operation of the motor stopping control means.

The structure of each component of the present invention and the structure preferably added to the above-described structure will be explained in the following.

When the primary coils and the secondary coils are provided in the motor, it is preferable to provide slots in the motor so as to accommodate the primary coil and the secondary coil in each slot in close proximity to each other. This structure can realize a transformer incorporating the primary coils and the secondary coils by a very partial improvement of the motor structure, and further makes the characteristics of the transformer obtained stable.

As the structure concerning the charging voltage to the auxiliary battery, it is preferable to provide a constant-voltage circuit. The constant-voltage circuit is provided between the rectifier and the auxiliary battery. The constant-voltage circuit supplies the charging voltage output from the rectifier to the auxiliary battery in the form of a constant voltage. In this way, it i possible to stably charge the auxiliary battery at a predetermined constant voltage.

The motor driving control of the motor is carried out by the control unit in the former fundamental structure (the structure which does not include the motor stopping control means) and by the motor driving control means in the latter structure (the structure which includes the motor stopping control means).

The motor driving control is carried out by, for example, the desired value control based on the rotational speed of the motor. That is, a means for detecting the rotational speed of the motor supplies the detected rotational speed to the control unit or the motor driving control means included therein (hereinunder, both will be called merely the motor driving control means for the purpose of simplification). The motor driving control means so controls alternating currents output from the inverter as to have the desired values on the basis of the supplied rotational speed. As a result, the rotational speed of the motor is so controlled as to have a predetermined desired value.

The motor driving control means preferably includes, for example, a command operation circuit and a control signal generator.

The command operation circuit determines the desired values in the desired value control. The control signal generator supplies a control signal to the inverter so that the value of the alternating current output from the inverter is coincident with the corresponding desired value.

The control signal generator is composed of, for example, a means for detecting the value of the alternating current output from the inverter and a means for generating a control signal subjected to pulse amplitude modulation. The latter means generates a control signal subjected to pulse amplitude modulation based on the difference between the value of the detected alternating current and the desired value.

This structure easily realizes the motor driving control of the motor.

The motor stopping control is carried out by the following means.

The motor stopping control means supplies alternating currents from the inverter to the primary coils for two phases of the predetermined number of primary coils.

In this way, no alternating field is generated in the motor and, hence, no torque for rotating the motor is generated. As a result of supplying the alternating currents to the primary coils, a secondary voltage is induced in the secondary coils. The secondary voltage obtained in this way is rectified so as to charge the auxiliary battery.

The desired value control is also possible in the motor stopping control as well as in the motor driving control.

For this purpose, for example, a means for detecting the alternating current of one phase from the alternating currents output from the inverter is provided and a means for generating a control signal subjected to pulse amplitude modulation based on the difference between the value of the detected alternating current and the desired value is also provided.

Since the motor stopping control means is only operated under a predetermined condition, the motor stopping control means is preferably accommodated in the control signal generator so as to miniaturize the electric automobile driving apparatus as a whole.

It is also preferably to provide a means for selectively driving the motor driving control means and the motor stopping control means according to the state in the structure having both means.

For example, it is preferable that the control unit has a mode switching portion which starts the motor stopping control means only when the predetermined conditions are satisfied. The predetermined conditions in this case are, for example, a) that the motor is not driven,
b) that the torque command for requiring the motor to be driven is not issued, and c) that the voltage of the auxiliary battery has dropped to not more than a predetermined value.

The control unit may also be provided with a switching means for connecting the stopping control means to the inverter when the alternation stopping command (a command issued by the mode switching portion when the above-described conditions are satisfied) is received from the mode switching portion.

This structure enables the switching between the motor stopping control and the motor driving control by a simple structure.

The above and other objects, features and advantages of the present invention will become clear from the following description of the preferred embodiments thereof, taken in conjunction with the accompanying drawings.

BRIEF DESCRIPTION OF THE DRAWINGS

FIGS. 4(a) and 4(b) show the structure of a second embodiment of an electric automobile driving apparatus according to the present invention, wherein

FIGS. 7(a) and 7(b) are explanatory views of the operation of the second embodiment at the time of stopping the motor, wherein

DESCRIPTION OF THE PREFERRED EMBODIMENTS

Preferred embodiments of the present invention will be explained hereinunder with reference to the accompanying drawings.

Figure 1:
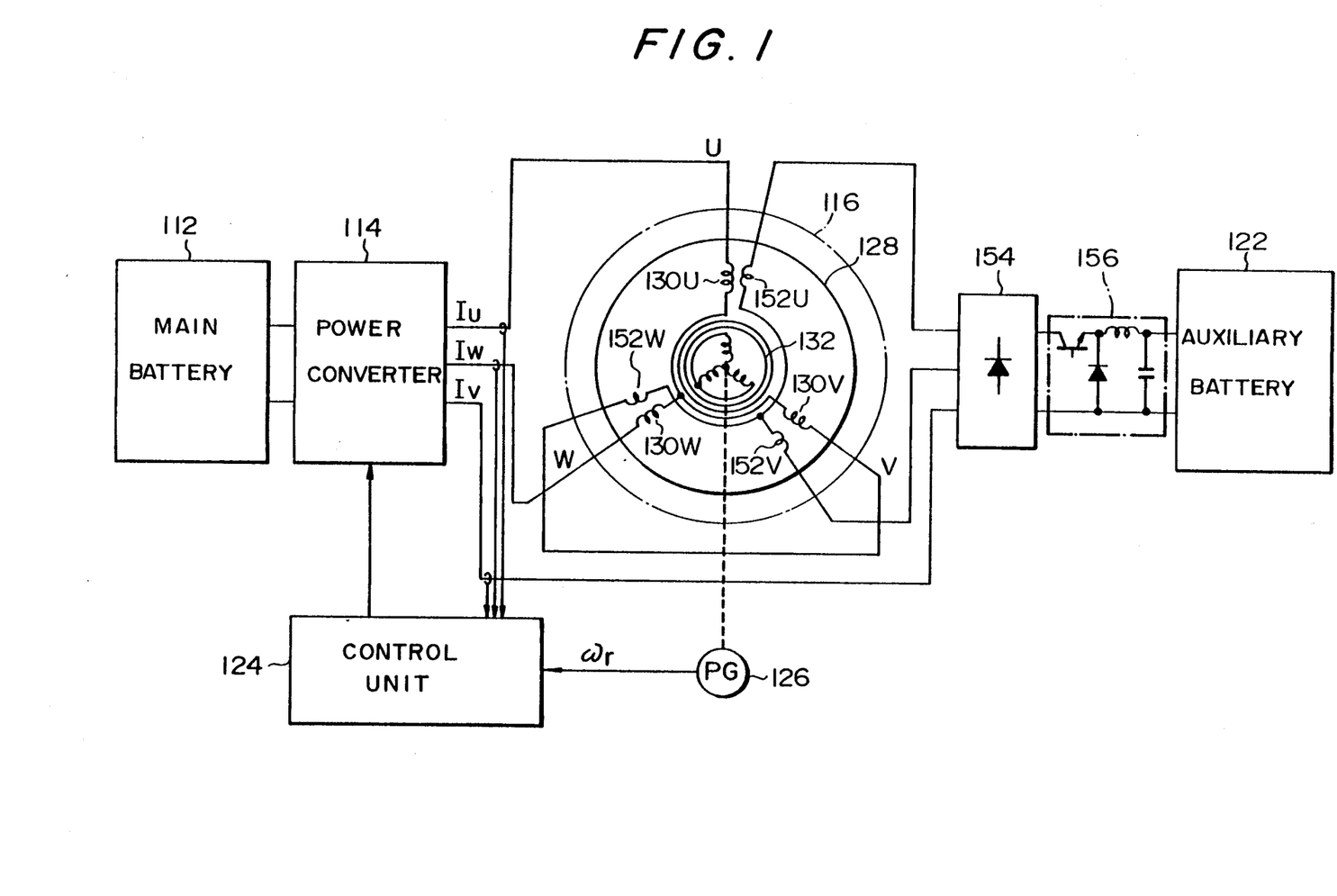
FIG. 1 shows the structure of a first embodiment of an electric automobile driving apparatus according to the present invention.

FIG. 1 shows the structure of a first embodiment of an electric automobile driving apparatus according to the present invention.

In FIG. 1, secondary coils 152U, 152V and 152W characteristic of the present invention are disposed in close proximity to primary coils 130U, 130V and 130W, respectively. The secondary coils 152 are connected to a rectifier 154 and further to an auxiliary battery 122 through a constant-voltage circuit 156.

For example, when a motor 116 is driven by a main battery 112, an alternating field is produced on the primary coils 130, and the alternating field induces an alternating secondary voltage in the secondary coils 152. The secondary voltage is rectified by the rectifier 154 and made constant by the constant-voltage circuit 156. The auxiliary battery 122 is charged with the thus-obtained DC voltage.

Figure 2:
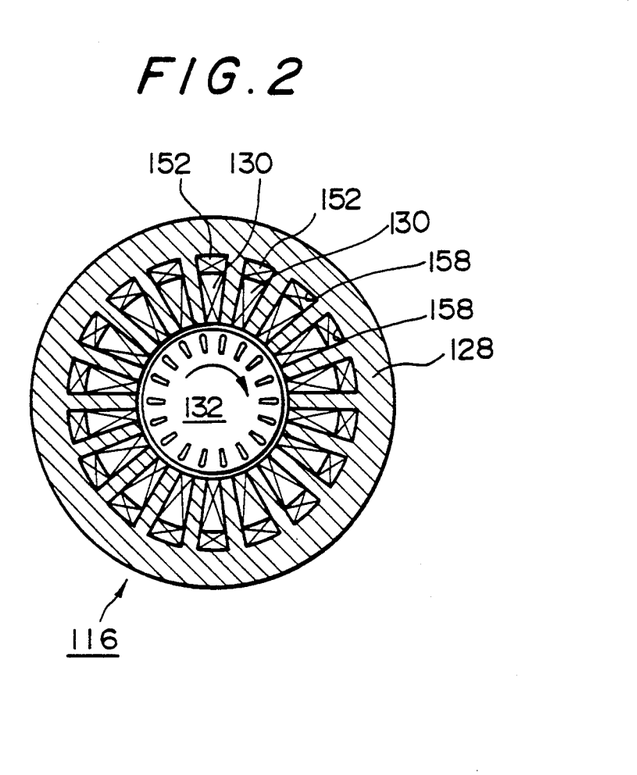
FIG. 2 is a sectional view of the primary coils and the secondary coils in the embodiment shown in FIG. 1, showing the coil winding structure.

FIG. 2 shows the coil winding structure of the motor 116 in this embodiment.

The motor 116 shown in FIG. 2 is what is called a bipolar AC motor. The motor 116 is provide with 18 slots. The primary coils 130U are wound around three slots in the same direction and wound around other three slots in the reverse direction. In this way, the primary coils 130U, 130V and 130W are wound around the corresponding slots. In FIG. 2, a rotor 132 is a cage rotor.

In FIG. 2, the secondary coil 152 characteristic of the present invention is wound around the bottom portion of the slot 158, and the primary coil 130 is wound around the slot at the portion above the secondary coil 152. When the alternating field is generated on the primary coil 130, the alternating field induces an AC voltage in the secondary coil 152.

In FIG. 1, the secondary coils 152 are connected in a Y connection. It is preferable that the neutral point in the Y connection of the secondary coils 152 and the neutral point in the Y connection of the primary coils 130 are not connected. The primary coil 130 and the secondary coil 150 may be wound around the slot either in what is called bunching winding or in what is called simultaneous winding.

The operation of this embodiment will now be explained.

When a DC voltage is output from the main battery 112, the motor 116 is rotated in the same way as in the conventional apparatuses shown in FIGS. 8 to 12. The alternating currents $I_U$, $I_V$ and $I_W$ are supplied to the primary coils 130U, 130V and 130W, respectively, of the motor 116, thereby generating an alternating field. The alternating field induces an AC voltage in the secondary coils 152U, 152V and 152W. If the voltage of the primary coil 130 of each phase is about 60 V, a voltage of about 20 to 30 V is induced in the secondary coil 152 of each phase. The thus-induced AC voltage is first rectified by the rectifier 154 and made constant by the constant-voltage circuit 156. The constant voltage charges the auxiliary battery 122. The constant-voltage circuit 156 shown in FIG. 1 includes a transistor for adjusting the output voltage. That is, by adjusting the base voltage of the transistor by chopper control or the like, it is possible to adjust the value of the DC voltage output from the constant-voltage circuit 156 to a desired value.

When the motor 116 is rotated without the output of a DC voltage from the main battery 112 (for example, at the time of braking), no alternating current is supplied to the primary coils 130. When a cage rotor is used as the rotor 132, as shown in FIG. 2, no alternating current is induced in the secondary coils 152. On the other hand, when a permanent magnet type rotor is used as the rotor 132, an alternating current is induced in the primary coils 132 and the secondary coils 152 due to the interlinkage of the magnetic fields caused by the rotor 132, thereby executing regenerative braking.

Figure 3:
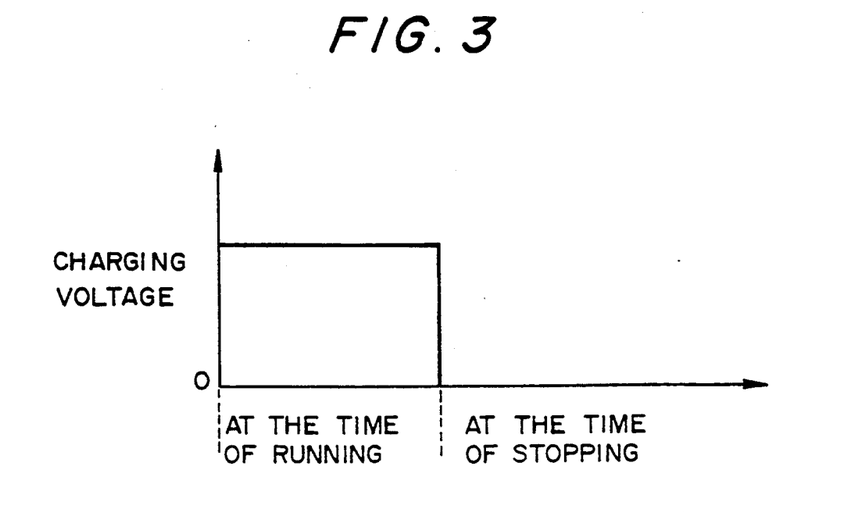
FIG. 3 is an explanatory view of the charging voltage output for charging the auxiliary battery.

FIG. 3 shows the charging voltage supplied to the auxiliary battery 122 in this embodiment. In FIG. 3, the charging voltage output at the time of braking, which is different depending upon the structure of the rotor 132, is omitted.

As is clear from FIG. 3, the charging voltage is supplied to the auxiliary battery 122 only when the electric automobile is running by the rotation of the motor 116 (what is called at the time of running), and no charging voltage for the auxiliary battery 122 is generated when the motor 116 is stopped and the electric automobile is also stopped (what is called at the time of stopping).

Figure 4A:
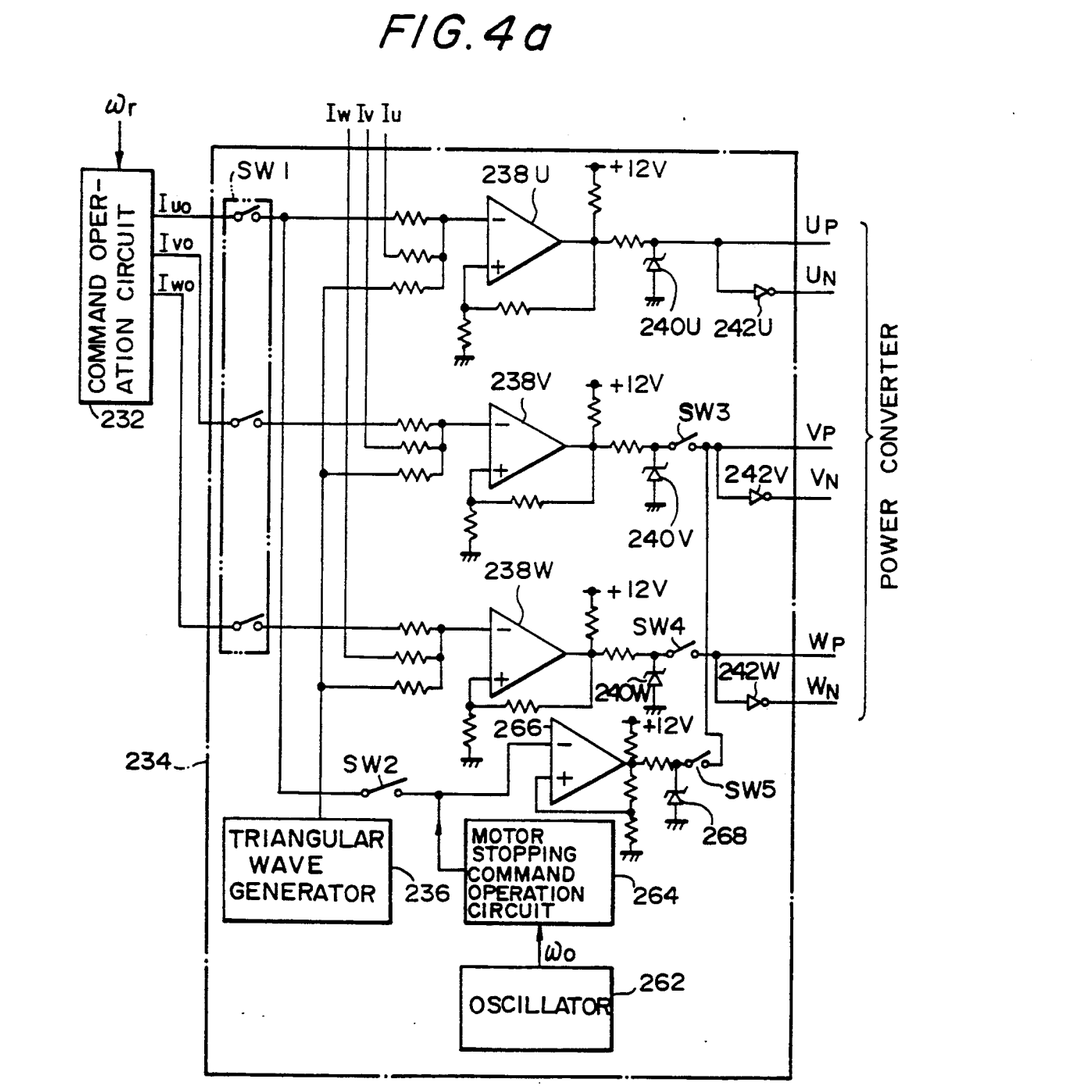
FIG. 4(a) shows the structure of the command operation circuit and the control signal generator in the control unit.
Figure 4B:
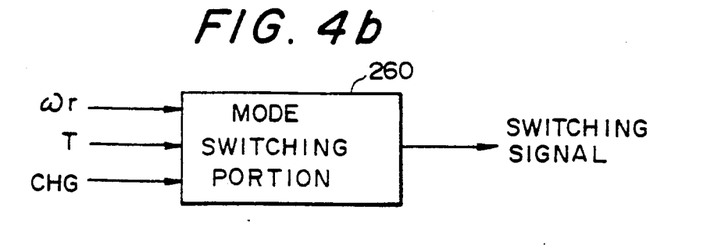
FIG. 4(b) shows the structure of the mode switching portion in the control unit.

FIGS. 4(a) and 4(b) show a further improved embodiment of an electric automobile driving apparatus. This embodiment enables a charging voltage for the auxiliary battery to be generated by the secondary coils even at the time of stopping.

FIGS. 4(a) and 4(b) only show the structure of the control unit.

This embodiment is different from the first embodiment shown in FIG. 1 in that the power converter is controlled by a control unit which is capable of switching between the control at the time or running and the control at the time of stopping, while the first embodiment adopts the control unit 124 having a similar structure to that of the conventional apparatus shown in FIG. 10.

More specifically, the control unit in the second embodiment is composed of a command operation circuit 232 and a control signal generator 234 which are shown in FIG. 4(a) and a mode switching portion 260 shown in FIG. 4(b).

The control signal generator 234 in this embodiment has the same structure as the control signal generator in the conventional apparatus shown in FIG. 10 except that an oscillator 262 for generating a sine wave having an angular frequency of $\omega_0$, a motor stopping command operation circuit 264 for calculating the values of the alternating currents at the time of stopping, and an operational amplifier 266 for amplifying the output of the motor stopping command operation circuit 264, a constant-voltage diode 268 connected to the output end of the operational amplifier 266 and switches $SW_1$, $SW_2$, $SW_3$, $SW_4$ and $SW_5$ which are so controlled as to turn on/off by the mode switching portion 260 are added thereto.

The operation of the second embodiment having the above-described structure will now be explained.

Figure 5:
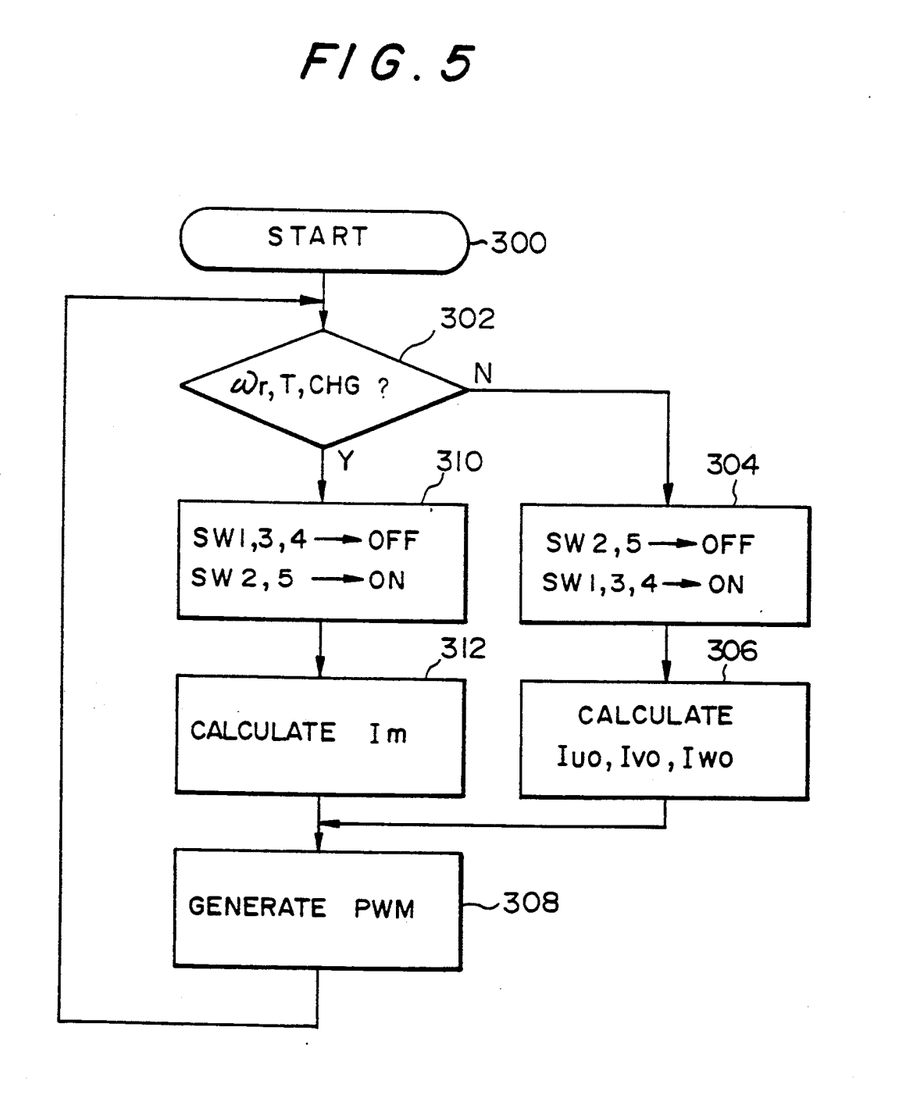
FIG. 5 is a flowchart of operation of the control unit in the second embodiment.

FIG. 5 shows the flow of the controlling operation of the control signal generator 234 in this embodiment.

When the controlling operation is initiated by turning on the power source of the control generator 234 or the like (step 300), the mode switching portion 260 first judges the conditions of the number of revolutions $\omega_r$, the torque command T and the charging command CHG. The torque command T is generated on the basis of the degree at which the operator of the electric automobile opens the accelerator and supplied from the external apparatus (step 302). The charging command CHG is a command supplied from the external apparatus on the basis of the drop of the output voltage of the auxiliary battery or the like. At the step 302 for judging the conditions, whether or not the following three conditions are satisfied is judged:

(1) that the number of revolutions $\omega_r$ of the motor is (i.e., the motor is stopped), (2) that the torque command T is not supplied (e.g., the accelerator is not pressed down) and (3) the charging command CHG is supplied (e.g., the voltage of the auxiliary battery has been dropped to not more than a predetermined value).

If it is judged at the step 302 for judging the conditions that these three conditions are not satisfied, the motor driving control is carried out on the basis of the desired values $I_{UO}$, $I_{VO}$ and $I_{WO}$ obtained from the command operation circuit 232.

In the motor driving control, the switches $SW_2$ and $SW_5$ are first turned off and the switches $SW_1$, $SW_3$ and $SW_4$ are turned on on the basis of the result of the judgement of the conditions at the step 302 supplied from the mode switching portion 260 (step 304).

When the switches $SW_2$ and $SW_5$ are turned off, the connection between the circuit relating to the motor stopping control, which will be described later, and the circuit relating to the motor driving control is broken. By turning on the switch $SW_1$, the command operation circuit 232 is connected to the operational amplifiers 238, and by turning on the switches $SW_3$ and $SW_4$, the operational amplifier 238V and the operational amplifier 238W are connected to the power converter.

When the step 304 has been carried out, the desired values $I_{UO}$, $I_{VO}$ and $I_{WO}$ are calculated by the command operation circuit 232 on the basis of the number of revolutions $\omega_r$ of the motor (step 306). On the basis of the thus-obtained desired values $I_{UO}$, $I_{VO}$ and $I_{WO}$, PWM control signals $U_P$, $U_N$, $V_P$, $V_N$, $W_P$ and $W_N$ are generated and output in the same way as by the control signal generator 34 in the conventional apparatus shown in FIG. 10 (step 308). Thereafter, the process returns to the step 302 for judging conditions.

On the other hand, if it is judged at the step 302 that the three conditions are not satisfied, namely, that the motor is stopped, the torque command T is not issued and the charging command CHG is issued due to the drop of the voltage of the auxiliary battery or the like, the control signal generator 234 executes the motor stopping control over the power converter.

In the motor stopping control, the switches $SW_1$, $SW_3$ and $SW_4$ are first turned off and the switches $SW_2$ and $SW_5$ are turned on (step 310). When the switch $SW_1$ is turned off, the connection between the command operation circuit 232 and the operational amplifiers 238 is broken, and when the switches $SW_3$ and $SW_4$ are turned off, the connection between the operational amplifiers 238V and 238W for the V-phase and the U-phase, respectively, and the power converter is broken. When the switches $SW_2$ and $SW_5$ are turned on, the motor stopping command operation circuit 264 is connected to the input end of the operational amplifier 238U and the output end of the operational amplifier 266 is connected to the output ends of the control signals $V_P$ and $V_N$.

Thereafter, the command stopping operational amplifier 264 calculates the alternating current command amplitude $I_m$ at the time of stopping (step 312). On the basis of the command amplitude $I_m$ calculated at the step 312, rectangular wave signals are output as the control signal $V_P$s and $V_N$, and PWM pulse signals are output as the control signals $U_P$ and $U_N$ (step 308). The process then returns to the step 302 for judging the conditions and the operation is continued.

Figure 6:
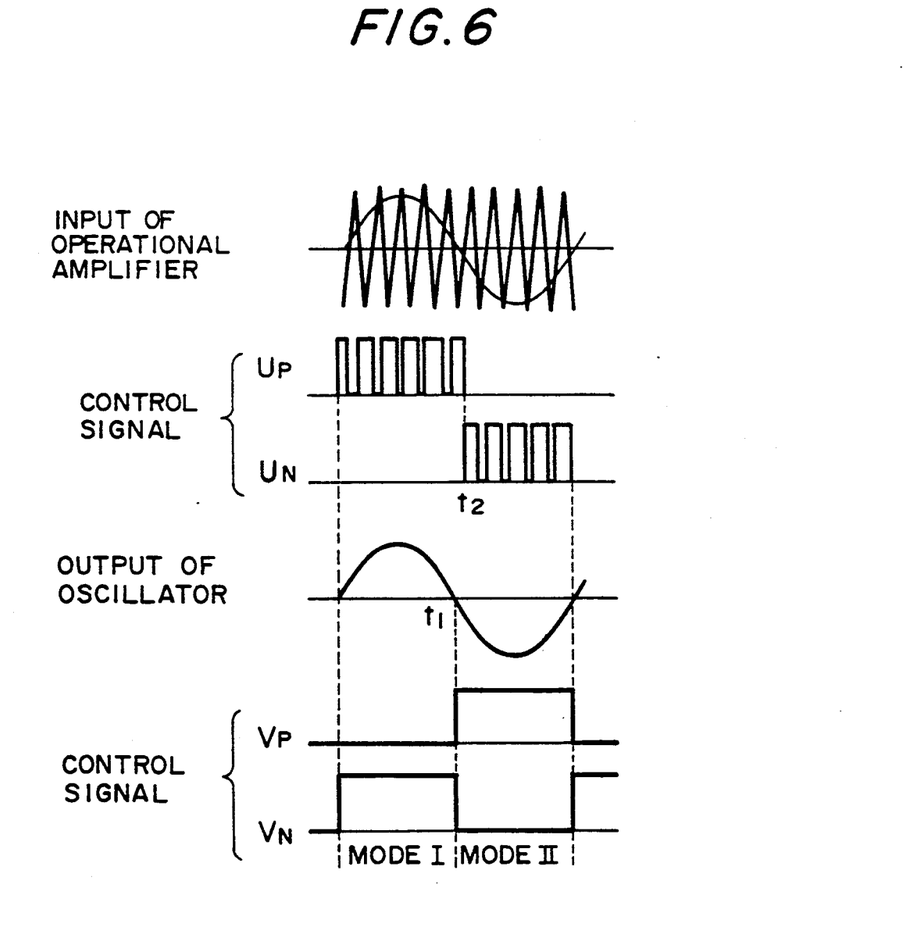
FIG. 6 is a timing chart of the operation of the second embodiment at the time of stopping the motor.

FIG. 6 shows the wave forms of the control signals in the motor stopping control.

The sine wave output from the oscillator 262 is a sine wave having an angular frequency of $\omega_0$ which crosses the zero point at time $t_1$. The motor stopping command operation circuit 264 calculates the command amplitude $I_m$, as described above, and a sine wave having an amplitude corresponding to the command amplitude $I_m$ and an angular frequency of $\omega_0$ is supplied to the operational amplifiers 238U and 266.

Since the triangular wave output from the triangular wave generator 236 has been input to the operational amplifier 238U, the signal output from the operational amplifier 238U is a signal subjected to PWM. The signal output from the operational amplifier 238U therefore has the inverted polarity at time $t_2$ in the vicinity of time $t_1$ at which the sine wave signal output from the oscillator 262 crosses the zero point. Thus, the pulse signals are alternately output as the control signal $U_P$ and $U_N$ in correspondence with the polarity of the pulse signal output from the operational amplifier 238U.

The sine wave signal output from the motor stopping command operation circuit 264 has also been input to the operational amplifier 266. The signal output from the operational amplifier 266 through the constant-voltage diode 268 is a rectangular wave current which crosses the zero point synchronously with the sine wave signal output from the motor stopping command operation circuit 264, and is output as the control signal $V_P$ during the positive period and as the control signal $V_N$ during the negative period.

Figure 7A:
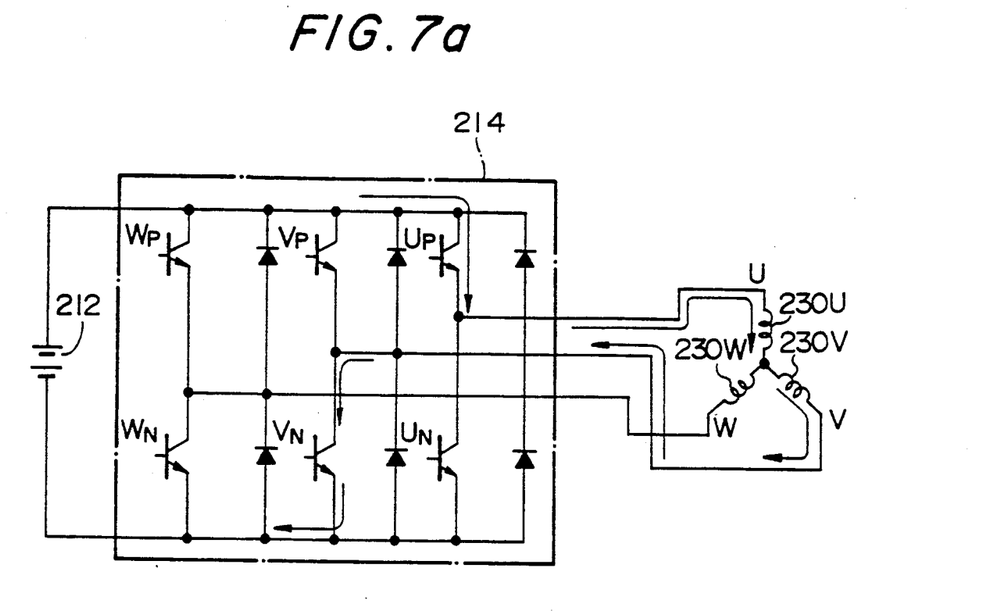
FIG. 7(a) is an explanatory view of the operation ih mode I.
Figure 7B:
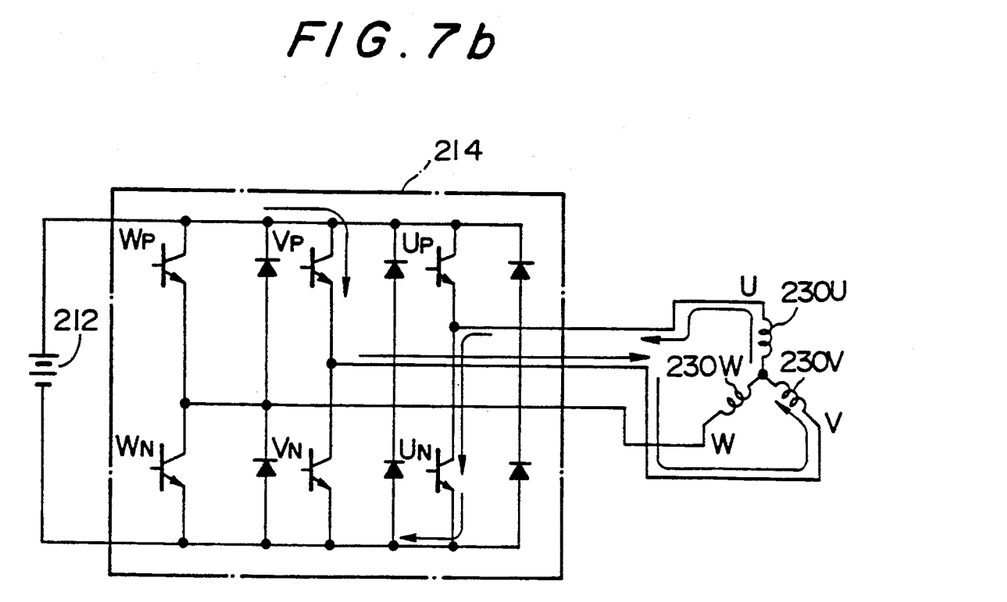
FIG. 7(b) is an explanatory view of the operation in mode II.

It is now defined that the period during which the sine wave signal output from the motor stopping command operation circuit 264 is positive is mode I and the period during which it is negative is mode II. FIGS. 7(a) and 7(b) show the operations at mode I and mode II, respectively.

In mode I, the control signal $U_P$ is a PWM pulse signal and the control signal $V_N$ has a positive value. Therefore, when such control signals $U_P$ and $V_N$ are supplied to a power converter 214, which is an invertor, the transistor to which the control signal $V_N$ is supplied is turned on and the transistor to which the control signal $U_P$ is supplied is turned on/off in the power converter 214. The DC voltage output from a main battery 212 is intermittently supplied between one end of a primary coil 230U of the U-phase and one end of a primary coil 230V of the V-phase, and an alternating current which corresponds to the control signal $U_P$ subjected to PWM, as shown in FIG. 6, flows on the primary coils 230U and 230V.

In mode II, the control signal $U_N$ is a PWM pulse signal and the control signal $V_P$ takes a positive value.

Therefore, the transistor to which the control signal $V_P$ is supplied is turned on and the transistor to which the control signal $U_N$ is supplied is turned on/off in mode II. The DC voltage output from the main battery 212 is intermittently supplied between one end of the primary coil 230V of the V-phase and one end of the primary coil 230U of the U-phase. In this case, an alternating current flows on the primary coils 230U and 230V in the reverse direction to that in mode I.

Either in mode I or mode II, the alternating current subjected to PWM flows only on the primary coils 230U and 230V, of the V-phase and U-phase, so that no alternating field is generated on the motor. The motor is therefore maintained in a stopped state. However, since a secondary voltage is induced in the series connection of the coils of the U-phase and the V-phase, it is possible to charge the auxiliary battery with the secondary voltage.

In this way, the second embodiment of the electric automobile driving apparatus according to the present invention, which has the advantages obtained from the first embodiment, is also advantageous in that the auxiliary battery can be charged while the electric automobile is stopped. The control of the charging of the auxiliary battery is therefore facilitated and the time for charging the auxiliary battery can be more freely selected, which leads to the improvement of the utility of the electric automobile driving apparatus.

As described above, according to the electric automobile driving apparatus, since the secondary voltage induced in the secondary coil is rectified and the auxiliary battery is charged with the DC voltage obtained as a result of the rectification, the DC-DC converter which is necessary for charging the auxiliary battery in the conventional apparatus and which includes a heavy material such as a transformer is dispensed with, thereby producing an electric automobile driving apparatus light in weight and low in cost.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An electric automobile driving apparatus comprising:
    a) a main battery for outputting a DC voltage having a predetermined value;
    b) an inverter for converting said DC voltage output from said main battery into the same number of alternating currents as a predetermined number of phases;
    c) a motor provided with the same number of primary coils as said predetermined number of phases for converting said alternating currents which are output from said inverter into a magnetic field and a secondary coil disposed in close proximity to at least one of said primary coils so that said magnetic field generated by said primary coils induces a secondary voltage in aid secondary coil, the magnetic filed also inducing a torque on a rotor of said motor;
    d) a control unit for driving said motor by alternating said alternating currents output from said inverter;
    e) an auxiliary battery for supplying an auxiliary voltage to electric appliances installed in an electric automobile; and
    f) a rectifier for converting said secondary voltage into a DC voltage having a predetermined value as a charging voltage, and charging said auxiliary battery with, and driving said electrical appliances by, said charging voltage.

2. An electric automobile driving apparatus according to claim 1, further comprising a means for detecting the rotational speed of said motor, wherein said control unit so controls each of said alternating currents output from said inverter as to have a desired value on the basis of the detected rotational speed of said motor.

3. An electric automobile driving apparatus according to claim 2, wherein said control unit includes:
    a command operation circuit for determining said desired value of each of said alternating currents output from said inverter on the basis of said detected rotational speed of said motor; and a control signal generator for outputting control signals so that each of said alternating currents output from said inverter has the value coincident with said desired value determined by said command operation circuit.

4. An electric automobile driving apparatus according to claim 3, wherein said control signal generator includes:
 a means for detecting the values of said alternating currents output from said inverter; and
 a means for generating control signals each subjected to pulse amplitude modulation on the basis of the difference between the detected value of each of said alternating currents and said desired value.

5. An electric automobile driving apparatus according to claim 1, wherein said motor includes a slot for accommodating each of said primary coils and said secondary coil.

6. An electric automobile driving apparatus according to claim 1, further comprising a constant-voltage circuit interposed between said rectifier and said auxiliary battery so as to supply said charging voltage output from said rectifier to said auxiliary battery in the form of a constant voltage.

7. An electric automobile driving apparatus comprising:
 a) a main battery for outputting a DC voltage having a predetermined value;
 b) an inverter for converting said DC voltage output from said main battery into the same number of alternating currents as a predetermined number of phases;
 c) a motor provided with the same number of primary coils as said predetermined number of phases for converting said alternating currents which are output from said inverter into a magnetic field and a secondary coil disposed in close proximity to at least one of said primary coils so that said magnetic field generated by said primary coils induces a secondary voltage in said secondary coil, the magnetic field also inducing a torque on a rotor of said motor;
 d) an auxiliary battery for supplying an auxiliary voltage to electric appliances installed in an electric automobile;
 e) a control unit including a motor driving control means for alternating said alternating currents output from said inverter when said motor is required to be driven, and a motor stopping control means for stopping the alternation of said alternating currents output from said inverter when at least the suspension of said motor and the charging of said auxiliary battery are required, thereby inducing said secondary voltage in said secondary coil while maintaining said motor in a stopped state; and
 f) a rectifier for converting said secondary voltage into a DC voltage having a predetermined value as a charging voltage, and charging said auxiliary battery with, and driving said electrical appliances by, said charging voltage.

8. An electric automobile driving apparatus according to claim 7, further comprising a means for detecting the rotational speed of said motor, wherein said motor driving control means so controls each of said alternating currents output from said inverter as to have a desired value on the basis of the detected rotational speed of said motor.

9. An electric automobile driving apparatus according to claim 8, wherein said motor driving control means includes:
 a command operation circuit for determining said desired value of each of said alternating currents output from said inverter on the basis of said detected rotational speed of said motor; and
 a control signal generator for outputting control signals so that each of said alternating currents output from said inverter has the value coincident with said desired value determined by said command operation circuit.

10. An electric automobile driving apparatus according to claim 9, wherein said control signal generator includes:
 a means for detecting the values of said alternating currents output from said inverter; and
 a means for generating control signals each subjected to pulse amplitude modulation on the basis of the difference between the detected value of each of said alternating currents and said desired value.

11. An electric automobile driving apparatus according to claim 7, wherein said control unit includes a mode switching portion for activating said motor stopping control means when three conditions co-exist, the three conditions being 1) said motor is not being driven, 2) a torque command indicating a request for the driving of said motor is not being issued, and 3) a voltage of said auxiliary battery being less than a predetermined value.

12. An electric automobile driving apparatus according to claim 11, further comprising a means for detecting a rotational speed of said motor, wherein said motor driving control means so controls each of said alternating currents output from said inverter as to have a desired value on a basis of the detected rotational speed of said motor.

13. An electric automobile driving apparatus according to claim 12, wherein said motor driving control means includes:
 a command operation circuit for determining said desired value of each of said alternating currents output from said inverter on a basis of said detected rotational speed of said motor; and
 a control signal generator for outputting control signals so that each of said alternating currents output from said inverter has a value coincident with said desired value determined by said command operation circuit.

14. An electric automobile driving apparatus according to claim 13, wherein said control signal generator includes:
 a means for detecting values of said alternating currents output from said inverter; and
 a means for generating control signals each subjected to pulse amplitude modulation on a basis of a difference between the value of each of said detected alternating currents and said desired value.

15. An electric automobile driving apparatus according to claim 7, wherein said motor stopping control means supplies said alternating currents from said inverter to two phases of the primary coils.

16. An electric automobile driving apparatus according to claim 15, wherein said motor stopping control means further includes:

a means for detecting a value of an alternating current of one phase on said alternating currents output from said inverter; and a means for generating a control signal subjected to pulse amplitude modulation on a basis of a difference between the detected value of said alternating current and said desired value.

17. An electric automobile driving apparatus according to claim 16, wherein said motor stopping control means is accommodated in said control signal generator.

18. An electric automobile driving apparatus according to claim 11, wherein:

said control unit includes a switching means for connecting said motor stopping control means to said inverter in accordance with a command for stopping an alternation issued from said mode switching portion; and said motor stopping control means supplies said alternating currents from said inverter to the primary coils of two phases of the predetermined number of primary coils.

19. An electric automobile driving apparatus according to claim 18, wherein said motor stopping control means includes:

a means for detecting a value of an alternating current of one phase on said alternating currents output from said inverter; and a means for generating a control signal subjected to pulse amplitude modulation on a basis of a difference between the detected value of said alternating current and said desired value.

20. An electric automobile driving apparatus according to claim 19, wherein said motor stopping control means is accommodated in said control signal generator.

* * * * *